United States Patent [19]
Beeteson et al.

[11] Patent Number: 5,889,372
[45] Date of Patent: Mar. 30, 1999

[54] DEVICE CATHODE WITH EXTRACTOR GRID FOR DISPLAY

[75] Inventors: John Beeteson; Andrew Ramsay Knox, both of Scotland, United Kingdom

[73] Assignee: International Business Machines Corporation, Armonk, N.Y.

[21] Appl. No.: 887,392

[22] Filed: Jul. 2, 1997

[30] Foreign Application Priority Data

Jan. 16, 1997 [GB] United Kingdom .................. 9700790

[51] Int. Cl.$^6$ ........................................ H01J 1/30
[52] U.S. Cl. .................... 315/169.1; 313/497; 345/74
[58] Field of Search .................... 313/496, 497; 315/169.1, 169.3; 345/74

[56] References Cited

U.S. PATENT DOCUMENTS

| | | | |
|---|---|---|---|
| 4,577,133 | 3/1986 | Wilson | 313/103 CM |
| 4,763,187 | 8/1988 | Biberian | 313/309 X |
| 5,153,483 | 10/1992 | Kishino et al. | 315/3 |
| 5,227,691 | 7/1993 | Murai et al. | 313/497 X |
| 5,402,041 | 3/1995 | Kishino et al. | 315/169.1 |
| 5,541,473 | 7/1996 | Duboc, Jr. et al. | 313/497 X |
| 5,654,607 | 8/1997 | Yamaguchi et al. | 313/495 |

FOREIGN PATENT DOCUMENTS

| | | |
|---|---|---|
| 0497627 | 1/1992 | European Pat. Off. . |
| 0479425 | 4/1992 | European Pat. Off. . |
| 0518612 | 6/1992 | European Pat. Off. . |
| 0660368 | 12/1994 | European Pat. Off. . |
| 0755042 | 7/1995 | European Pat. Off. . |
| 0734043 | 3/1996 | European Pat. Off. . |
| 0806790 | 5/1997 | European Pat. Off. . |

*Primary Examiner*—Rober Pascal
*Assistant Examiner*—Justin P. Bettendorf
*Attorney, Agent, or Firm*—Bernard D. Bogdon

[57] ABSTRACT

A display device includes field emission cathode apparatus for emitting electrons. A plurality of electron beams are formed from the field emission cathode apparatus. A screen, which has a phosphor coating facing the cathode receives the plurality of electron beams. The phosphor coating includes a plurality of pixels each corresponding to a different one of said plurality of electron beams. A grid electrode is disposed between the cathode and the screen for controlling the flow of electrons from the cathode. The field emission cathode includes extractor grid means, having a plurality of separately addressable portions associated with each of said plurality of pixels. A gamma transfer function between input data value and beam current is provided in order to emulate a conventional CRT. This can be achieved by use of a lookup table.

16 Claims, 4 Drawing Sheets

30 tips per mesh
35 meshes per pixel
≃1000 tips per pixel

DEVICE CATHODE WITH EXTRACTOR GRID FOR DISPLAY

FIELD OF THE INVENTION

The present invention relates to matrix addressed electron beam displays and particularly to a switchable area cathode for use in matrix addressed electron beam displays.

BACKGROUND OF THE INVENTION

Flat panel electron beam displays comprise a cathode and an anode contained in an evacuated envelope. In operation, the cathode is held at a negative potential relative to the anode. Electrons are emitted from the cathode. The potential difference between the cathode and the anode accelerates the emitted electrons from the cathode towards the anode in a beam. A beam current thus flows between the anode and the cathode. In flat panel electron beam displays a matrix arrangement is disposed between the cathode and the anode. The matrix arrangement is formed by a pair of "combs" placed at right angles to each other. These are commonly referred to as rows and columns. Each pixel or subpixel lies at the intersection of a row and a column. Each of the combs has many separate elements which is comprised of either rows or columns. In operation, a control voltage is applied to each element of each of the combs. The control voltage applied to each element imposes an electrostatic force on the electron beam associated with that element whether it be a row or a column. The electron beam current associated with that element can be adjusted by adjusting the control voltage.

For displays that allow multiple levels of intensity to be displayed on the screen, the rows and columns perform distinct functions. The comb having rows (or horizontal lines) is used to set the bias conditions for the pixel, that is, it has a simple control voltage applied that switches the individual row conductors between an OFF (unbiased) state and an ON (biased) state. The circuit which provides this switching is simple and inexpensive. The comb having columns (or vertical lines) is used to control the brightness at which pixels which are biased ON will be displayed. The brightness is set at an analog level between being equivalent to the pixel being biased OFF and the maximum level which the display will support. The number of intermediate levels which are supported is determined by the circuits driving the columns. The analog drive circuits which provide this switching are relatively complex and expensive. In some displays the operation of the rows and columns may be transposed.

The analog drive circuits which drive the columns are usually implemented by the use of a Digital to Analog Converter (DAC) for each of the column conductors.

The display operates so that if an analog voltage from one of the column drivers (DACs) intersects with an OFF (or unbiased) row, then no beam current will flow, regardless of the analog output value of the DAC. If an analog voltage from one of the column drivers (DACs) intersects with an ON (or biased) row, then the pixel becomes active, and the beam current which flows will be determined by the DAC setting. It is the analog voltage from the DAC which determines how much beam current flows and hence, what intensity is displayed for that pixel. In a practical implementation, all of the DACs are driven in parallel with data for respective pixels in a given row, so that an entire row of data is presented simultaneously. The row which is active and displaying data propagates down the screen as the entire frame of data is constructed.

For a display having 1024 pixels in each row of the display, this means that 1024 separate DAC circuits are needed. The DAC circuits are relatively complex and expensive and the cost of these circuits is a significant proportion of the overall cost of the flat panel display. If a separate DAC is used for each of the three subpixels, associated with each of the three colours, that make up a pixel in a colour display, then 3072 DAC circuits are needed, which adds further to the overall cost of the flat panel display.

SUMMARY OF THE INVENTION

In accordance with the present invention, there is now provided a display device including field emission cathode apparatus having extractor grid apparatus for emitting electrons; apparatus for forming the emitted electrons into a plurality of electron beams; a screen for receiving the plurality of electron beams, the screen having a phosphor coating facing the cathode apparatus, the phosphor coating includes a plurality of pixels each corresponding to a different one of said plurality of electron beams; grid electrode apparatus disposed between the cathode apparatus and the screen for selectively allowing or blocking the flow of electrons from the cathode apparatus; and wherein the extractor grid apparatus has a plurality of separately addressable portions associated with each of the plurality of pixels. The provision of separately addressable portions of the extractor grids associated with each of the pixels provides for solving the problem of analog control of the beam current from a field emission display device.

Preferably, the field emission cathode apparatus is a microtip cathode and the microtip cathode includes Molybdenum. In a preferred embodiment, the extractor grid is a mesh.

In another embodiment, the field emission cathode is a metal-insulator composite. In yet another embodiment, the field emission cathode is carbon nanotube.

In a preferred embodiment, the separately addressable portions are arranged as concentric rings, however they may be arranged in other shapes, such as quadrilaterals. Concentric rings used as separately addressable portions have the advantage that the center point of each of the separately addressable portions of the grid is the same. This has the advantage that any mapping of the cathode physical structure onto the electron beam structure and hence to the anode and front of screen, is such that the structure of the subpixel is less visible to the user. As the beam current increases, so does the spot diameter. Preferably, the extractor grid apparatus has four separately addressable portions. Yet further preferably, the four separately addressable portions of the extractor grid apparatus have relative areas for emission of 1, 2, 4 and 8, respectively.

The extractor grid may be deposited by means of thin film lithographic deposition techniques such as evaporation or sputtering.

Another feature of the invention is that the plurality of pixels are arranged in rows and each of the separately addressable portions associated with each of the plurality of pixels in a given row and having a common relative area, are connected together by a common conductor as is further illustrated and discussed with respect to FIGS. 5 and 6.

Yet another feature of the invention is that a gamma transfer function may be used to map between an input data value and the corresponding electron beam current to provide an emulation of a gamma function of a conventional CRT as a state of the art CRT, commercially available at the priority date of filing of this patent document. In a preferred embodiment, a lookup table is used to provide the mapping between the input data value and the corresponding electron beam current. The advantage of providing a gamma transfer function from digital input data is that this emulates a conventional CRT display and so the same image is seen by a user as would be displayed on the conventional CRT using any of a wide range of existing applications. Additionally, the use of a gamma transfer function allows matching of a display device output to that obtained from a printer or from a scanned photographic image. The transfer function can be dynamically changed by reprogramming a lookup table used to implement the function.

The invention also provides a computer system including memory; data transfer apparatus for transferring data to and from the memory; processor apparatus for processing data stored in the memory; and a display device as described above.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENTS

Figure 1:
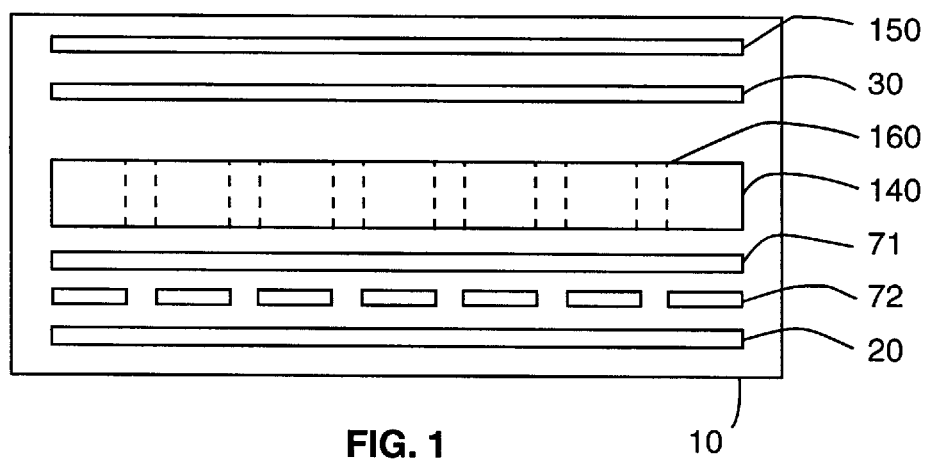
FIG. 1 is a simplified cross-sectional and partially schematic view of an example of a magnetic matrix display device according to the principles of the present invention.

Referring to FIG. 1, an example of a magnetic matrix display device 10 comprises a planar shaped cathode 20 facing a planar shaped anode 30. A phosphor coating 150 is disposed on the side of the anode 30 remote from the cathode. A permanent magnet 140 is disposed between the anode 30 and the cathode 20. The magnet 140 is perforated by a two dimensional matrix of channels or "wells" 160. A grid assembly is disposed between the magnet 140 and the cathode 20. The grid assembly comprises first and second electrically isolated arrays of parallel conductors hereinafter referred to as first grids 71 and second grids 72 respectively. The first grids 71 are arranged orthogonally to the second grids 72 to form a lattice pattern. Apertures are formed in the first grids 71 and the second grids 72. The apertures are located at each intersection of a first grid 71 and a second grid 72. Each aperture of each of the first and second grids is aligned to form a different well 160.

Figure 2:
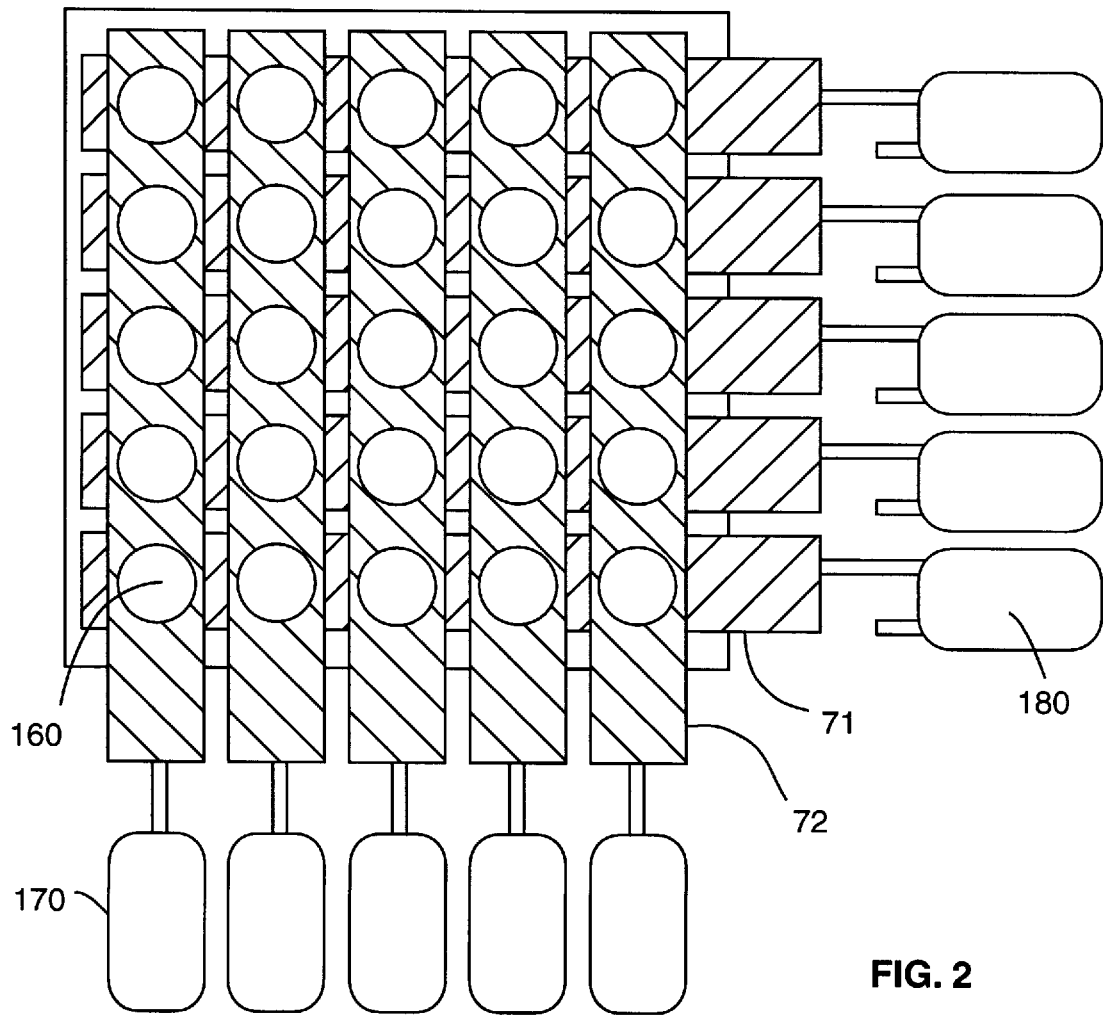
FIG. 2 is a plan view of grid assembly of the example of FIG. 1 when viewed from the underside of FIG 1.

Referring to FIG. 2, column drive circuitry 170 is connected to the second grids 72. Row drive circuitry 180 is connected to the first grids 71. This has the advantage that for a conventional display having a four to three aspect ratio, with more columns than rows, the number of more complex expensive analog drivers is reduced at the cost of having more simple, cheap digital switches. In operation, the anode 30 is held at a higher potential than the cathode 20. Electrons emitted from the cathode 20 are thus accelerated towards the anode 30. As electrons enter each of the wells 160 in the magnet 140 they are collimated into a dense beam by the magnetic field therein.

In operation, admittance of electrons to the wells 160 is selectively controlled via the grid assembly of first grid 71 and second grid 72. Each well 160 is addressable by appropriate voltage signals applied by the row drive circuitry 180 and the column drive circuitry 170 to the corresponding first grid 71 and second grid 72. Electrons are thus selectively admitted or blocked from entering each well 160, passing through the magnet 140 and reaching the corresponding region of the phosphor coating 150 to generate a pixel of a displayed image on the screen. The pixels of the displayed image are scanned in a refresh pattern. To produce the refresh pattern, a column of pixels is energised by applying an appropriate voltage, via the column drive circuitry 170 to the corresponding second grid 72 with the voltage on the first grids 71 set via the row drive circuitry 180 so that no beam current flows. The voltages on the remaining second grids 72 are set by the column drive circuitry 170 so that no beam current flows for any operating voltage on the first grids 71. The voltages on the first grids 71 are then modulated by row drive circuitry 180 as a function of input video data corresponding to the energised column of pixels. The process is then repeated for the next successive column. The row and column functions may be transposed relative to that conventionally used in LCDs, that is the rows are driven by an analog voltage and the columns are switched between two analog levels.

In the present invention planar shaped cathode 20 is a field emission cathode. Known field emission cathodes include microtips, metal-insulator composites and carbon nanotubes. The invention is applicable to any cathode type which is deposited as a flat plane emitter.

Figure 3:
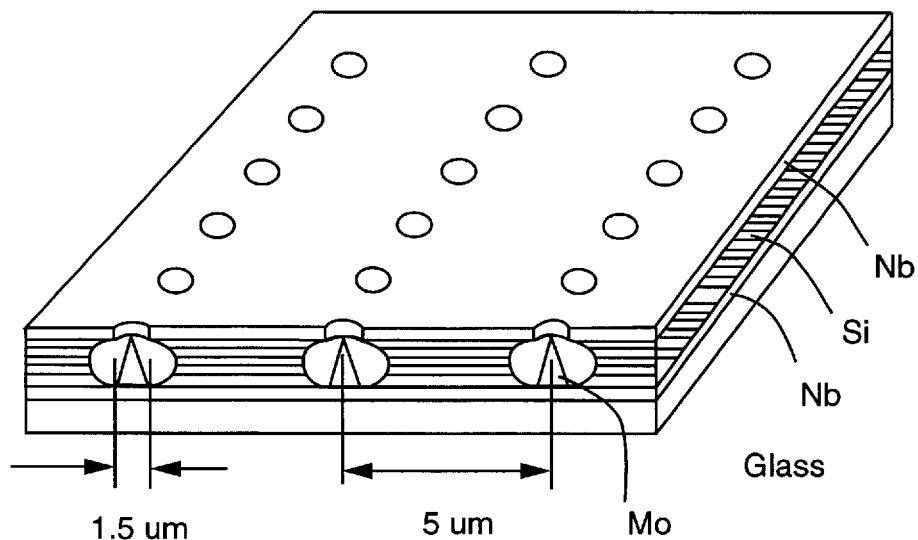
FIG. 3 is a close-up view of a field emission microtip cathode.

A preferred field emission cathode includes an array of atomically dimensioned sharp tips of a material such as molybdenum. In operation, a very high electric field is applied to the tips via a cathode control grid or extractor grid. The field allows electrons to be drawn off the tips without application of heat to the cathode. FIG. 3 shows a close-up view of a field emission microtip cathode. A glass substrate has layers of niobium, silicon and niobium positioned on it. Molybdenum points extending through holes in the niobium, silicon and niobium layer are fabricated. The atomically dimensioned sharp molybdenum tips are typically 1.5 $\mu$m across at their bases and are spaced 5 $\mu$m apart.

Figure 4:
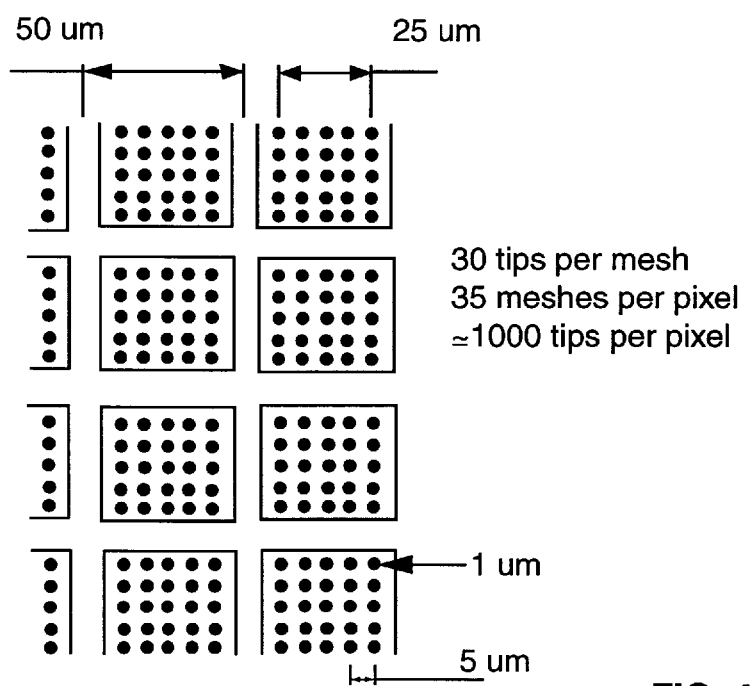
FIG. 4 is a plan view of the microtip cathode of FIG. 4.

FIG. 4 shows, in plan view, a specific embodiment of FIG. 3, in which each of the openings of the mesh contains 30 atomically dimensioned sharp molybdenum tips. The area of cathode associated with each pixel of the display has 35 openings in the mesh for each pixel. The openings in the mesh are typically on a 50 $\mu$m pitch. Each of the dots in FIG. 4 corresponds to one of the tips shown in FIG. 3. This gives approximately 1000 tips per pixel.

A voltage of 50 to 125 volts is applied between the cathode control grid and the tips and typically provides sufficient electric field strength to produce electron flow. In order to use the electrons thus generated, a good vacuum within the enclosing envelope is required. Details of a practical process for the production of such tips can be found in Spindt et al, "Physical properties of thin film field emission cathodes", J. Appl. Physics, Vol. 147, 1976 and an application to a display in Ghis et al, "Sealed vacuum devices: Microtips fluorescent display", Third International Vacuum Microelectronics Conference, Monterey, July 1990.

Another type of field emission cathode uses metal-insulator composites such as carbon particles embedded in resin. Alternatively, a planar metal electrode may be coated with graphite, silicon, iron or other particles embedded in resin. Application of a high voltage gradient (several kV/m) results in field emission from the particles, producing high current densities. These resin coated cathodes have the advantage of being relatively unaffected by poor vacuum conditions, but have problems with current instability. These cathodes are described in Khairnar and Joag, "Pencil lead field emission", Colloque de Physique, No. C8, November 1989, p.C8–85 and Bajic et al, "Factors affecting the stability of cold-cathode formed by coating a planar electrode with a metal-insulator composite", Colloque de Physique, No. C8, November 1989, p.C8–79.

A further type of field emission cathode uses carbon nanotubes. A layer of vertically oriented 10 nm diameter, 1 $\mu$m long hollow carbon tubes are placed under a copper grid with a 200V potential difference, and followed by a final anode. Large vertically collimated field emission currents can be obtained and the method of manufacture of the layer is said to allow unlimited cathode areas at very low cost. Such an electron source is described in WA de Heer et al, "A carbon nanotube field-emission electron source", Science, Vol. 270, p. 1179, 17 Nov. 1995.

A characteristic of field emission is that a certain threshold electric field intensity must be passed before any emission occurs. Once the threshold electric field intensity is passed, emission starts and very rapidly grows to high values of emission. A practical difficulty that has been encountered with Field Emission Displays (FEDs) is the steepness of this emission curve, which has the effect of providing only binary control of the level of emission. The level of emission is either zero or a high value of emission. Analog control of the beam current resulting from the emission is difficult in such devices. In addition, most FEDs use a low final anode voltage of only a few thousand volts, thus requiring that a high beam current is used in order to compensate for a low phosphor efficiency.

Another characteristic of a cathode based on an array of field emission tips is that, due to the strong field gradient, all the electrons released from the individual cathode tips are accelerated away from the cathode region. By analogy with the thermionic cathode found in CRTs, the cathode used in FEDs may be said to be operating in emission saturation, rather than in space charge limited condition. This means that for a given point on the transfer curve, the number of electrons released, and hence the beam current, are directly proportional to the area of the emitter.

As described above for a prior art display, a large number of points are fabricated in an array and an extractor grid is driven with a proportional analog voltage from a DAC to provide beam current control.

In a display according to the present invention, a number of separate extractor grids are used which have different relative emission areas. Each addressable pixel is associated with a number of these separate extractor grids. Since the level of emission is proportional to the emission area, the level of emission is controlled by which of the extractor grids have a voltage applied. In a preferred embodiment, there are four extractor grids having relative emission areas of 1, 2, 4 and 8. The extractor grid having a relative emission area of 1 is driven by a digital bit 0. The extractor grid having a relative emission area of 2 is driven by a digital bit 1. Similarly, the extractor grids having relative emission areas of 4 and 8 are driven by a digital bit 2 and 3. In this way the total emission area which is driven is proportional to the digital data presented on digital bits 0 to 3.

In a display according to the present invention, the control of the number of electrons reaching the phosphor coating 150 associated with each pixel, and hence the intensity of that pixel, is by means of the control of the total emission area associated with that pixel. This contrasts with the prior art where the voltage on the first grids driven by analog drivers was used for this control. The first grids and associated drivers of the magnetic matrix display shown in FIG. 2 are not necessary when a cathode of the present invention is used. The second grids and associated switches are however necessary.

Figure 5:
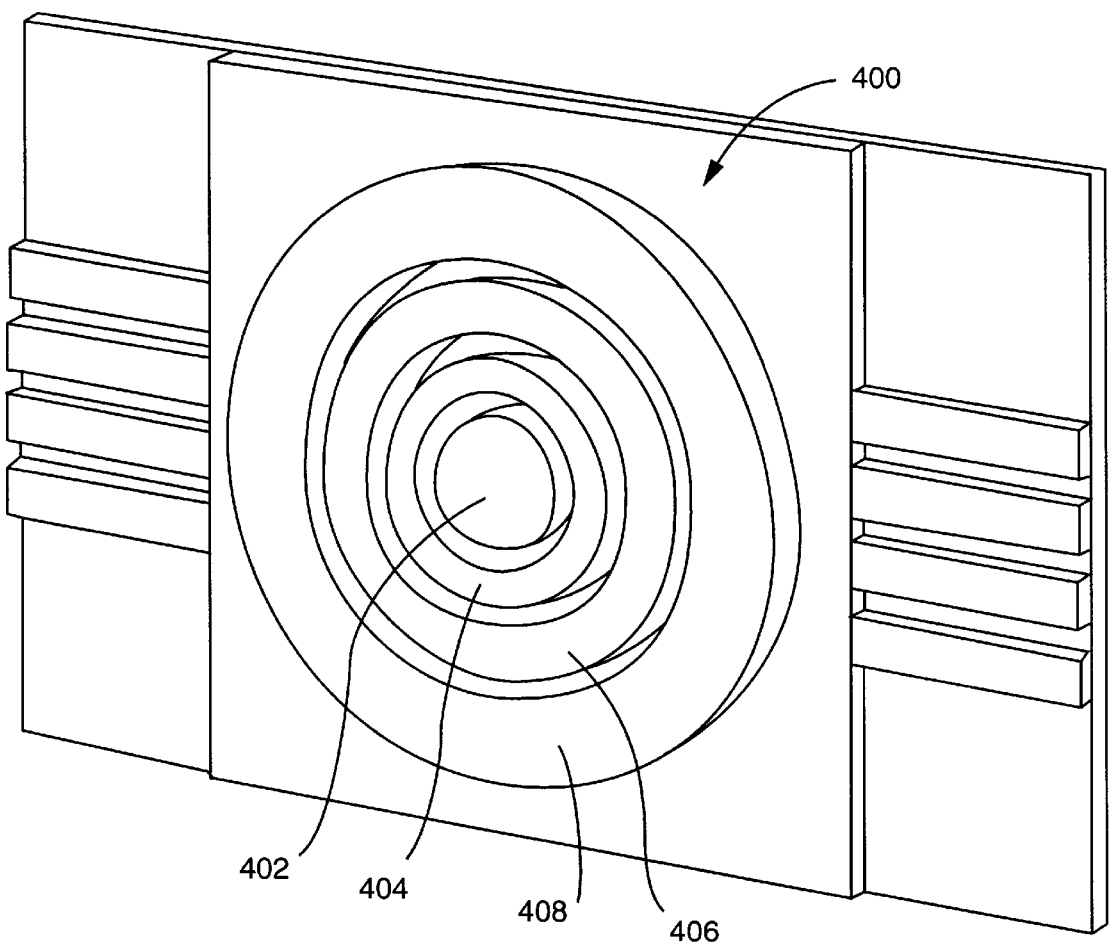
FIG. 5 shows a view of a 4 bit extractor grid according to the present invention.

FIG. 5 shows such an emitter based on 4 bit digital data input. An area of field emission tips 400 is overlaid by four areas of extractor grids 402, 404, 406 and 408. The central emission area 402 has a total area of A. The next radially-outward concentric ring area 404 has a total area of 2A. The third radially-outward concentric ring area 406 has a total area of 4A. The final radially-outward concentric ring area 408 has a total area of 8A.

The areas of extractor grid are not limited to being concentric rings. They may be any shape provided the relationship of their relative areas is such as to achieve variations in the total emission area with changing applied digital data. For example, they may be quadrilateral in shape and suitably arranged to achieve a reasonable packing density. Stripes may be used to achieve this or rectangular areas.

Figure 6:
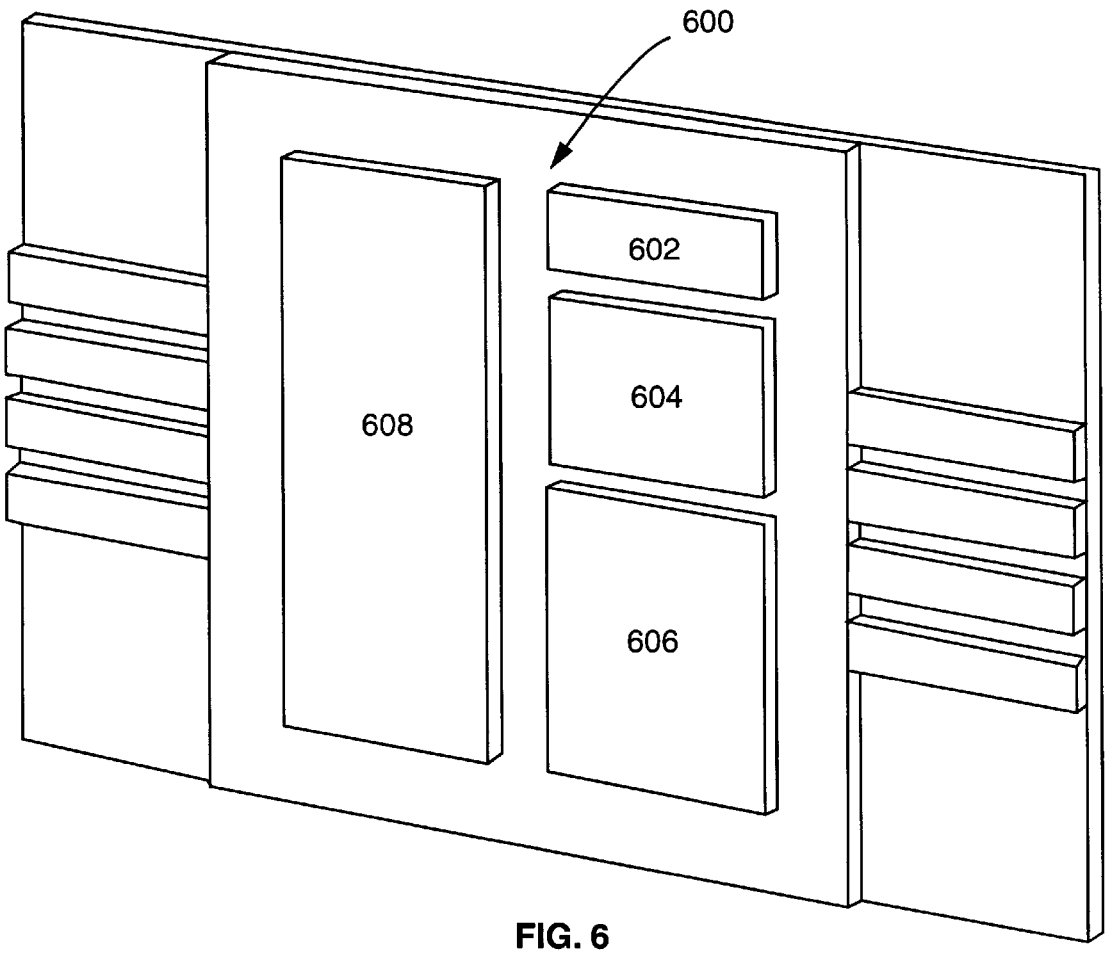
FIG. 6 shows a view of another 4 bit extractor grid according to the present invention.

FIG. 6 shows a further example of an emitter based on 4 bit digital data input. An area of field emission tips 600 is overlaid by four areas of extractor grids 602, 604, 606 and 608. The first emission area 602 has dimensions of $\sqrt{15}/7$ by $7/\sqrt{15}$ giving a total area of 1. The second emission area 604 has dimensions of $2\sqrt{15}/7$ by $7/\sqrt{15}$ giving a total area of 2. The third emission area 606 has dimensions of $4\sqrt{15}/7$ by $7/\sqrt{15}$ giving a total area of 4. The fourth emission area 608 has dimensions of $\sqrt{15}$ by $8/\sqrt{15}$ giving a total area of 8. The emission areas are arranged as shown in FIG. 6 so as to form a square emitting area of the same size as a pixel.

Additionally, the relative areas need not be part of a binary increasing sequence (1, 2, 4, 8, . . . ). They may be any predetermined sequence of relative areas. The number of extractor grid elements associated with each pixel is not limited to four. The number may be any number between one and the maximum number which can be accommodated within the total emission area associated with a pixel. The preferred embodiment uses four extractor grid elements because this allows sixteen different levels of emission. A corresponding amount of digital drive data must be available to drive the extractor grid elements.

There is a gap between each of the concentric rings in the preferred embodiment so that electrical breakdown does not occur when one of the rings has a voltage applied to it and the adjacent ring does not have a voltage applied. As mentioned earlier, the voltages applied are in the range of 50 to 125 volts, so the gaps must be sufficient so that breakdown does not occur. The extractor grid requires a fine spacing with small holes and narrow gap between the extractor grid and the emitter surface. This is so that a low voltage can provide a large electric field gradient. Typically, the holes are 1 to 2 $\mu$m in diameter and the spacing from the extractor grid to the emitter surface is 10 $\mu$m. The deposition of the extractor grid will be by lithographic deposition techniques such as by evaporation or by sputtering. In an alternative embodiment, a uniform plane surface extractor is used and the actual emitter of electrons is patterned and driven to provide the field gradient.

Also shown in FIG. 5 are the conductors that are used to connect a row of such emission areas together. In a preferred embodiment, a row of all the extractor elements having a relative area of A are connected together through one of the respective four conductors illustrated on each side of the extractor grid of FIG. 5. Similarly, a row of all of the extractor elements having relative areas of 2A and of 4A and of 8A are connected together. Connections are provided for each row for each of the emission areas (A, 2A, 4A and 8A). In a manner similar to that of the prior art, separate data is applied to all of the rows and a given column is selected for the display of image data. The given column is deselected and a new set of separate data for a new column is applied to the rows. The new column is then selected for the display of image data.

In a conventional CRT, there is a well known relationship between the cathode (or the grid) drive voltage and the beam current that flows. This relationship is commonly referred to as the "gamma" of the display. The beam current that flows in response to a given drive voltage is proportional to the drive voltage raised to the power of gamma($\gamma$), that is $$I \propto V^\gamma.$$

The value of Gamma for a typical CRT is in the range of 2.4 to 2.8.

The gamma function is a continuous function, since it is a function of the voltage seen at the space charge cloud in front of the physical cathode. In an emitter of the present invention, there is not a space charge cloud in front of the physical cathode surface, since substantially all electrons released from the cathode form beam current (saturation current limited). A small percentage of electrons may be lost by such mechanisms as the provision of small amounts of charge on insulating surfaces.

Non space charge limited emission means that there is no "averaging" effect to remove local emission variations. A space charge cloud effectively decouples the beam current from the cathode emitting surface. The space charge cloud from a thermionic cathode results from a cathode current which is typically greater than one hundred times the beam current being supplied, so that local variations in thermionic emission over the cathode area are hidden from the electron beam by the space charge cloud.

In the switched emitter scheme of the present invention, the drive voltages are digital representations (on or off). The continuous nature of the gamma curve can thus only be approximated. Since the beam current is proportional to the emission area, then the emission area needs to be made a function of the digital representation of the voltage applied, rather than directly proportional to it. This will be further explained with reference to Table 1.

TABLE 1

Drive voltage versus Beam Current and Emission Area

| Voltage | Current (Gamma = 1) | Current (Gamma = 2.5) | Current (Best Fit) | Relative Area |
|---|---|---|---|---|
| 0.0000 | 0.0000 | 0.0000 | 0.0000 | 0 |
| 0.0666 | 0.0666 | 0.0011 | 0.0000 | 0 |
| 0.1333 | 0.1333 | 0.0065 | 0.0000 | 0 |
| 0.2000 | 0.2000 | 0.0179 | 0.0000 | 0 |
| 0.2666 | 0.2666 | 0.0370 | 0.0666 | 1A |
| 0.3333 | 0.3333 | 0.0640 | 0.0666 | 1A |
| 0.4000 | 0.4000 | 0.1012 | 0.1333 | 2A |
| 0.4666 | 0.4666 | 0.1488 | 0.1333 | 2A |
| 0.5333 | 0.5333 | 0.2077 | 0.2000 | 3A |
| 0.6000 | 0.6000 | 0.2789 | 0.2666 | 4A |
| 0.6666 | 0.6666 | 0.3629 | 0.3333 | 5A |
| 0.7333 | 0.7333 | 0.4605 | 0.4666 | 7A |
| 0.8000 | 0.8000 | 0.5724 | 0.6000 | 9A |
| 0.8666 | 0.8666 | 0.6992 | 0.6666 | 10A |
| 0.9333 | 0.9333 | 0.8416 | 0.8666 | 13A |
| 1.0000 | 1.0000 | 1.0000 | 1.0000 | 15A |

The column headed Voltage in Table 1 is the normalised drive voltage applied to the cathode (or grid) of a conventional CRT. The column headed Current (Gamma=1) in Table 1 is the beam current that would flow in response to the applied drive voltage if the gamma of the CRT was 1, that is a linear transfer function. The column headed Current (Gamma=2.5) in Table 1 is the beam current that would flow in response to the applied drive voltage if the gamma of the CRT was 2.5, that is a typical value of gamma for a conventional CRT. The column in Table 1 headed Current (Best Fit) is the beam current that would flow if the emission areas were mapped to produce a best fit to the curve with a gamma of 2.5. The values of the emission area needed are shown in the column of Table 1 headed Relative Area.

The use of these values maps the linear transfer function of a switched area cathode to a gamma function of a conventional CRT. Only 11 of the 16 possible relative areas are used. No beam current flows until a drive voltage (normalised) of 0.2666 is applied. In a preferred embodiment, this mapping is done using a table lookup ROM. In an alternative embodiment, the mapping may be done by a memory which is dynamically alterable, so as to allow programming by a user to vary the transfer function.

Figure 8:
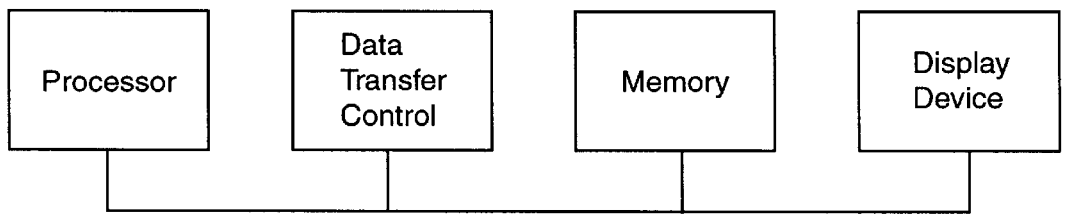
FIG. 8 is a schematic block diagram of a typical computer system incorporating a display device according to the principles of the present invention.
Figure 7:
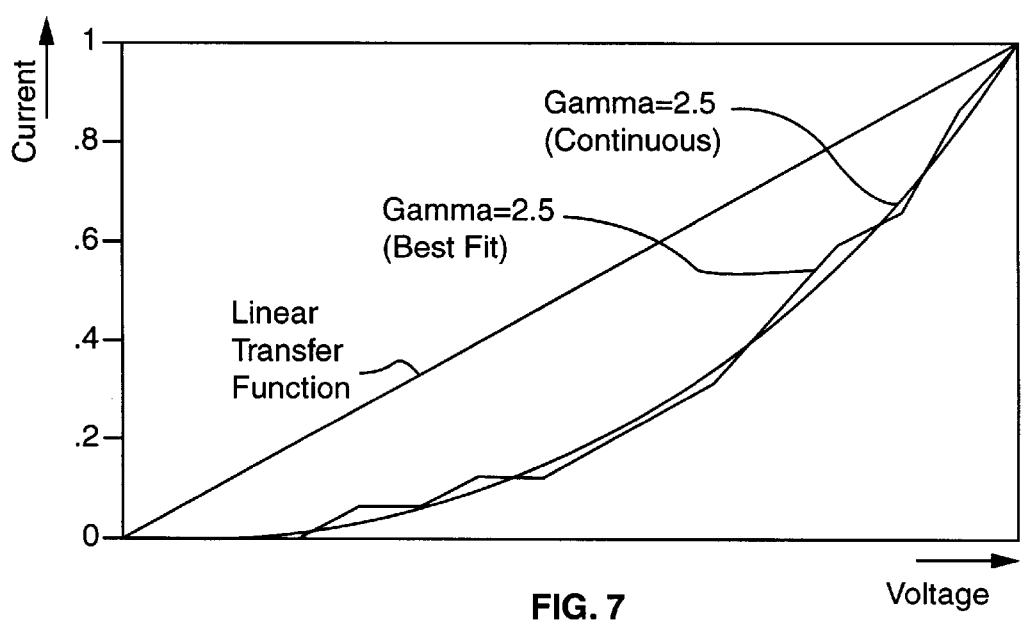
FIG. 7 is a graph showing transfer functions between drive voltage applied and beam current flowing.

FIG. 7 shows the data from table 1 plotted in graphical form. Line 702 shows the linear transfer function, equivalent to a Gamma of 1. As can be seen, the approximation to the Gamma=2.5 transfer function is coarse for low beam current values, but achieves a reasonable match at higher beam current values. With more emission areas per pixel cathode site, the matching to the ideal analog transfer function will be improved. FIG. 8 illustrates, in a simplistic block diagram, a typical computer system for incorporation of the principles of the present invention as is illustrated and disclosed herein with regard to FIGS. 1–6.

What is claimed is:

1. A flat panel display device comprising:
   a field emission cathode including a multiplicity of emission electrodes for emitting electrons;
   means for forming the emitted electrons into a plurality of electron beams; a screen for receiving the plurality of electron beams, the screen having a phosphor coating facing the cathode, the phosphor coating defining a plurality of pixels for display and each pixel of the plurality of pixels corresponding to a different one of the plurality of electron beams;
   a grid electrode assemblage disposed between the field emission cathode and the screen for selectively passing or blocking the emitted electrons from the field emission cathode; and an extractor grid disposed before each emission electrode of the multiplicity of emission electrodes for forming the emitted electrons wherein the extractor grid, has a plurality of separately addressable portions associated with each pixel of the plurality of pixels.

2. The flat panel display device as defined in claim 1 wherein each emission electrode of the multiplicity of emission electrodes of the field emission cathode is a microtip cathode.

3. The flat panel display device as defined in claim 2 wherein the microtip cathode includes molybdenum.

4. The flat panel display device as defined in claim 1 wherein the plurality of pixels are arranged linearly and each of the separately addressable portions associated with each pixel of the plurality of pixels in each of the linear arrangements and having a common relative area, are connected together by a common conductor.

5. The flat panel display device as defined in claim 1 wherein each emission electrode of the multiplicity of emission electrodes of the field emission cathode includes a metal-insulator composite.

6. The flat panel display device as defined in claim 1 wherein each emission electrode of the multiplicity of emission electrodes of the field emission cathode is a carbon nanotube.

7. The flat panel display device as defined in claim 1 wherein the separately addressable portions of each extractor grid disposed before each emission electrode of the multiplicity of emission electrodes for forming the emitted electrons are circular in shape and are arranged as concentric rings about a center most circular separately addressable portion.

8. The flat panel display device as defined in claim 1 wherein the separately addressable portions of each extractor grid disposed before each emission electrode of the multiplicity of emission electrodes for forming the emitted electrons are quadrilateral in shape and are arranged as separately addressable quadrilateral portions.

9. The flat panel display device as defined in claim 1 wherein the separately addressable portions of each extractor gridhas relative areas forming a binary increasing sequence.

10. The flat panel display device as defined in claim 1 wherein each extractor grid has four separately addressable portions.

11. The flat panel display device as defined in claim 10 wherein the relative size of the areas of the four separately addressable portions of each extractor grid is 1, 2, 4 and 8, respectively.

12. The flat panel display device as defined in claim 1 wherein the extractor grid is a deposited thin film photographic deposition.

13. The flat panel display device as defined in claim 1 wherein a gamma transfer function is used to map between an input data value and a corresponding electron beam current to provide an emulation of a gamma function of a CRT.

14. The flat panel display device as defined in claim 13 wherein a lookup table provides mapping between the input data value and the corresponding electron beam current.

15. The flat panel display device as defined in claim 14 wherein the lookup table is dynamically programmable.

16. A computer system comprising:

memory;

data transfer means for transferring data to and from the memory;

processor means for processing data stored in the memory; and a flat panel display device for displaying data processed by the processor means further including field emission cathode including a multiplicity of emission electrodes for emitting electrons;

means for forming the emitted electrons into a plurality of electron beams;

a screen for receiving the plurality of electron beams, the screen having a phosphor coating facing the cathode, the phosphor coating defining a plurality of pixels for display and each pixel of the plurality of pixels corresponding to a different one of the plurality of electron beams;

a grid electrode assemblage disposed between the field emission cathode and the screen for selectively passing or blocking the emitted electrons from the field emission cathode; and an extractor grid disposed before each emission electrode of the multiplicity of emission electrodes for forming the emitted electrons wherein the extractor grid, has a plurality of separately addressable portions associated with each pixel of the plurality of pixels.

* * * * *